United States Patent [19]
Larsson

[11] Patent Number: 6,131,653
[45] Date of Patent: *Oct. 17, 2000

[54] METHOD AND APPARATUS FOR DEHUMIDIFYING AND CONDITIONING AIR

[76] Inventor: Donald E. Larsson, 1512 Ashley Dr., Virginia Beach, Va. 23454

[ * ] Notice: This patent issued on a continued prosecution application filed under 37 CFR 1.53(d), and is subject to the twenty year patent term provisions of 35 U.S.C. 154(a)(2).

[21] Appl. No.: 08/613,085

[22] Filed: Mar. 8, 1996

[51] Int. Cl.[7] ................................................. F25B 29/00
[52] U.S. Cl. ........................... 165/228; 165/227; 165/224; 165/48.1; 165/54; 62/90; 62/176.5; 62/176.6; 62/173
[58] Field of Search ............................. 165/54, 215, 216, 165/227, 228, 66, 224; 62/90, 93, 176.5, 173

[56] References Cited

U.S. PATENT DOCUMENTS

| | | | |
|---|---|---|---|
| 1,888,242 | 11/1932 | Sholtes | 62/90 |
| 1,965,078 | 7/1934 | Hewitt et al. | 62/90 |
| 2,048,137 | 7/1936 | Palmer | 62/90 |
| 2,214,057 | 9/1940 | Hull | 62/176.5 |
| 2,237,332 | 4/1941 | Bretzlaff et al. | |
| 2,254,185 | 8/1941 | Newton | 165/216 |
| 2,391,838 | 12/1945 | Kleinhaus et al. | 165/235 |
| 2,495,856 | 1/1950 | Markusen | 165/215 |
| 2,522,484 | 9/1950 | Ringquist et al. | 62/90 |
| 2,793,812 | 5/1957 | McDonald | 165/216 |
| 2,917,288 | 12/1959 | Sims, Jr. et al. | 165/235 |
| 2,984,459 | 5/1961 | Waterfill | 165/216 |
| 3,415,313 | 12/1968 | Olstad | 62/93 |
| 3,587,243 | 6/1971 | Keller | 62/93 |
| 3,656,542 | 4/1972 | Darm | 165/66 |
| 3,791,369 | 2/1974 | Des Champs . | |
| 3,835,921 | 9/1974 | Faris et al. | |
| 4,099,553 | 7/1978 | Burnham et al. | 165/216 |
| 4,109,704 | 8/1978 | Spethmann . | |
| 4,428,205 | 1/1984 | Doderer . | |
| 4,512,397 | 4/1985 | Stark . | |
| 4,549,601 | 10/1985 | Wellman et al. . | |
| 4,607,498 | 8/1986 | Dinh . | |
| 4,750,545 | 6/1988 | Hile et al. | 165/228 |
| 4,761,966 | 8/1988 | Stark . | |
| 5,060,720 | 10/1991 | Wollaber et al. | 165/122 |
| 5,179,998 | 1/1993 | Des Champs . | |
| 5,181,552 | 1/1993 | Eiermann . | |
| 5,303,771 | 4/1994 | Des Champs . | |
| 5,337,577 | 8/1994 | Eiermann . | |

FOREIGN PATENT DOCUMENTS

| | | | |
|---|---|---|---|
| 665620 | 1/1952 | United Kingdom | 62/93 |

OTHER PUBLICATIONS

Haines, Roger W., Control Systems for Heating, Ventilating and Air Conditioning, Second Edition, Van Nostrand copyright 1977 pp. 76–80, 178 and 180.

*Primary Examiner*—John K. Ford
*Attorney, Agent, or Firm*—Nixon & Vanderhye, P.C.

[57] ABSTRACT

An air dehumidifying and conditioning system (20) draws incoming air (32) through a fan (40) and uses heat from the fan (40) and fan motor (48) to heat air discharged from the fan. The system then divides air discharged from the fan into a supply stream (50) and a scavenge stream (52). The supply stream is passed through a pre-cooler (60A) and an air cooler (60) for cooling and dehumidification. If necessary, the scavenge stream is heated with a pre-heater (62A) and a supplemental heater (62). The dehumidified air of the supply stream (50) is then heated by passing through a heat exchanger (80), with the heating by the heat exchanger being accomplished using the scavenge stream (52). Should no heating, cooling, or dehumidifying be required, a bypass stream (54) formed from the scavenge stream (52) is transmitted to the conditioned space.

31 Claims, 3 Drawing Sheets

METHOD AND APPARATUS FOR DEHUMIDIFYING AND CONDITIONING AIR

BACKGROUND

1. Field of Invention

This invention pertains to the conditioning of air, and particularly to the dehumidification and cooling of air for use in a structure such as a building.

2. Related Art and Other Considerations

Dehumidification and cooling of external air for provision to a conditioned space (such as an interior of a building) is energy intensive, and accordingly expensive. Typically, the external air, being hot and wet, must first be cooled to a low temperature (e.g., 48 degrees F.) by a cooling/dehumifying coil to remove moisture. As a second step, the cooled air must be reheated to an intermediate temperature (e.g., 72 degrees F. dry bulb) using a reheat coil to obtain a low relative humidity condition (e.g., 40% relative humidity). Significantly, operation of the reheat coil expends precious energy.

Accordingly, it is an object of the present invention to provide method and apparatus for dehumidifying and conditioning air without extensive supplemental heating operation.

SUMMARY

In one mode of operation, an air dehumidifying and conditioning system draws incoming air through a fan and uses heat from the fan and the fan motor to heat air discharged from the fan. The system then divides air discharged from the fan into a supply stream and a scavenge stream. The supply stream is passed through a pre-cooler and an air cooler for cooling and dehumidification. If necessary, the scavenge stream is heated (with a pre-heater and a supplemental heater). The dehumidified air of the supply stream is then heated by passing through a heat exchanger, with the heating by the heat exchanger being accomplished using the scavenge stream.

In another mode of operation (i.e., when moisture content of the incoming air and its temperature are equal to that required at the end of the process), the scavenge stream is shut off to the heat exchanger and a bypass damper opened to create a bypass stream whereby bypass air is transmitted to the conditioned space. The pre-heater and supplemental heater are not energized; supply stream air is shut off to the pre-cooler, cooler, and heat exchanger, allowing only bypass air to the conditioned space.

As yet another mode of operation the moisture content of the incoming air is less than that required at the end of the process and only heating is required. The supply stream is shut off to the pre-cooler, cooler, and heat exchanger. The scavenge stream is shut off to the heat exchanger and open to the bypass damper. The preheater and/or the heater are energized, thereby allowing heated air of the bypass stream to pass to the conditioned space.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

Figure 1:
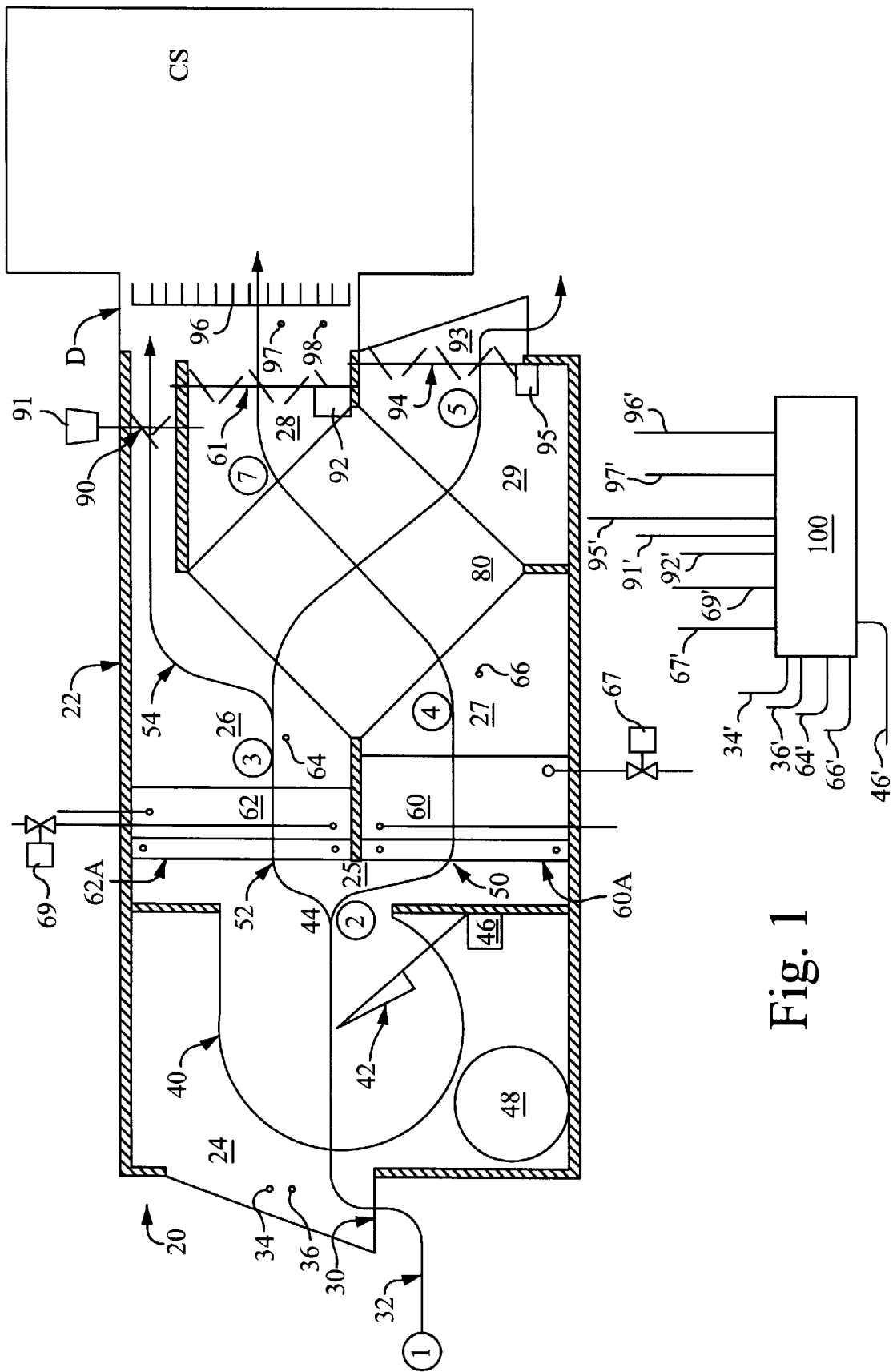
FIG. 1 is a schematic view of an air dehumidifying and condition system according to a first embodiment of the invention.

FIG. 1 shows system 20 for treating (e.g., dehumidifying and conditioning) air for supply to a conditioned space CS. System 20 includes a housing 22 fabricated from any suitable material. Suitable materials include sheet metal, steel, galvanized steel, fiberglass, and plastic, for example, and may be either of a double wall or single wall construction. Where appropriate, housing 22 is insulated to further the operations and functions of system 20 as hereinafter described. When exteriorily situated (e.g, roof mounted), system 20 is weather proofed.

Housing 22 is subdivided into a plurality of compartments or regions. The compartments here of interest are an entry compartment 24; a partitioning compartment 25; a scavenging stream treatment compartment 26; a supply stream treatment compartment 27; a supply stream discharge compartment 28; and, a scavenge stream discharge compartment 29. Supply stream discharge compartment 28 communicates with conditioned space CS by conventional means, such as duct D.

Figure 3:
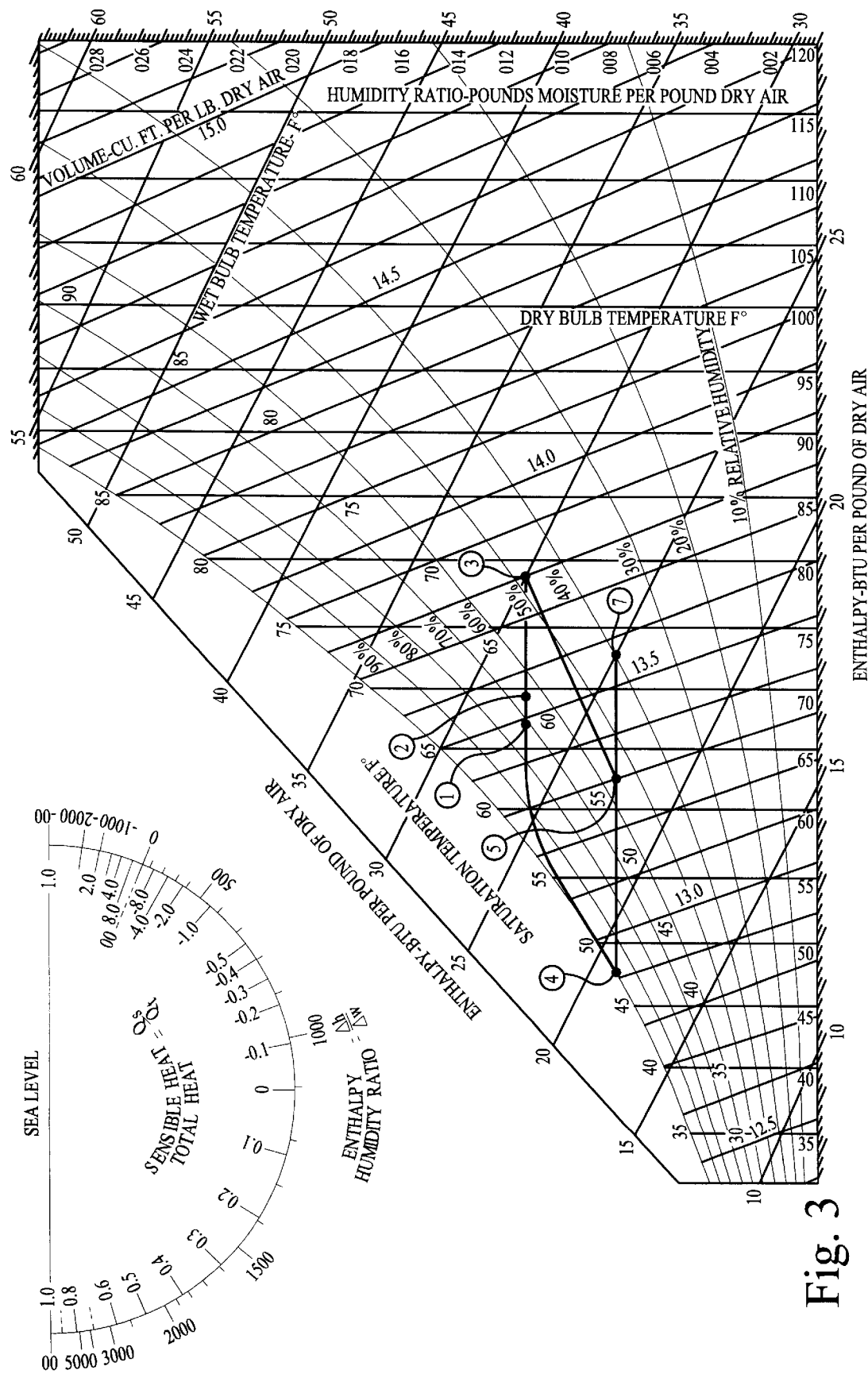
FIG. 3 is a psychrometric chart showing various parameters of air at strategic positions in the system of FIG. 1.

Important for the present invention are psychrometric conditions at various strategic locations or positions in system 20. Such positions, described in more detail hereinafter, are denoted by encircled numerals 1–5 and 7 in FIG. 1. As further explained below, exemplary psychrometric conditions for each of these positions 1–5 and 7 are shown by comparably encircled numerals associated with data points in the chart of FIG. 3. FIG. 3 is ASHRAE Psychrometric Chart No. 1, normal temperature and barometric pressure at 29.921 inches of mercury.

In FIG. 3, condition OA67-61-72-57-4350 is represented. In such condition, 67 represents the entering dry bulb temperature; 61 represents the entering wet bulb temperature; 72 represents the leaving dry bulb temperature; 57 represents the leaving wet bulb temperature; and 4350 represents the supply in cubic feet per minute.

Returning to FIG. 1, entry compartment 24 has an inlet 30 for admitting therein an input stream 32 of air. Proximate inlet 30 is the first strategic position of system 20, as denoted by encircled numeral 1. Of significance at position 1 are the volume, temperature and humidity of input stream 32. To this end, entry compartment 24 is provided with a dry bulb temperature sensor 34 and a relative humidity sensor 36.

Also positioned in entry compartment 24 is motorized fan 40, which serves as means for impelling input stream 32 into system 20. Fan 40 can be any of many suitable types, including centrifugal, propeller, plug, positive displacement, with either backwardly inclined, forwardly inclined, or airfoil blades. Fan 40 has inlet vanes 42 and a fan discharge port 44. In differing embodiments, fan 40 can have inlet vanes, nested inlet vanes, conical inlet vanes, a movable disk or cone, a variable frequency drive, a magnetic induction drive, discharge dampers, and/or mechanical sheave modulation.

Inlet vanes 42 are operably connected to a vane controller 46. Vane controller 46 serves to control the amount of air which can be ingested by fan 40, and consequently the amount of air dischargable by fan 40 from port 44. Fan 40 is powered by fan motor 48 (e.g., electrical or high efficiency). Heat from fan 40 and fan motor 48 serves to heat input stream 32 being impelled by fan 40. The man skilled in the art is able to determine the amount of heat supplied by fan 40 and fan motor 48 in consultation with ASHRE Chapter 26.10, Table 4, "Heat Gain From Typical Electric Motors".

Fan discharge port 44 communicates with partitioning compartment 25 of system 20. Partitioning compartment 25 serves to divide the impelled input stream into a supply stream 50 and a scavenge stream 52. As will be understood hereinafter, it is supply stream 50 which, after cooling and heating, is supplied to conditioned space CS. Partitioning space 25 is a second of the strategic positions of system 20, as indicated by encircled numeral 2.

In partitioning compartment 25, air discharged from fan 40 is split into the supply stream 50 and the scavenge stream 52. In this regard, the air that becomes supply stream 50 enters an intake port of pre-cooler 60A and air cooler 60. Cooler 60 forms an entrance to supply stream treatment compartment 27. The air that becomes scavenge stream 52 travels parallel to the direction of supply stream 50 and (when scavenger damper 94 is open and bypass damper 90 is closed) is incident upon an intake port of pre-heater 62A (not energized) and supplemental air heater 62. Scavenge damper 94 is an actuatable, pivotal damper situated at an exit of scavenge stream discharge compartment 29.

A third of the strategic positions of system 20, indicated by encircled numeral 3, is situated at an output port of pre-heater 62A and supplemental air heater 62 in scavenge stream treatment compartment 26. Accordingly, a dry bulb temperature sensor 64 (e.g., a thermostat) is provided proximate position 3. A fourth of the strategic positions, denoted by encircled numeral 4, is situated at an output port of cooler 60. A temperature sensor 66 (e.g., thermostat) is accordingly provided proximate position 4.

Air cooler 60 and pre-cooler 60A can be apparatus which cools a stream of air. While in the illustrated embodiment of FIG. 1 cooler 60 and pre-cooler 60A happen each to be a cooling coil, it should be understood that other types of pre-coolers/coolers such as a chilled water coil, a low temperature brine coil (glycol), a direct expansion evaporator, direct expansion plates, thermal wheel or a heat pipe can be utilized. For the coil embodiment of FIG. 1, cooler 60 is provided with an actuator, such as valve actuator 67.

Similarly, supplemental heater 62 and pre-heater 62A can be any type of heater suitable for heating a stream of air, including a heater which uses hot water, hot gas, electricity, or steam. In the illustrated embodiment, heater 62 and pre-heater 62A each happen to be a heating coil operable with valve actuator 69. Other types of heaters, such as a hot water coil, a steam coil, a refrigerant condenser, a condenser coil, an electric element, a gas furnace, an oil furnace, a refrigerant hot gas coil, a heat pipe, thermal wheel or a brine coil can also be used.

Heat exchanger 80 forms an interface between supply stream treatment compartment 27 and supply stream discharge compartment 28, on the one hand, and scavenge stream treatment compartment 26 and scavenge stream discharge compartment 29, on the other. In particular, after cooling by cooler 60, supply stream 50 is directed through heat exchanger 80 into supply stream discharge compartment 28. Likewise, after possible heating by heater 62, scavenge stream 52 is transmitted through heat exchanger 80 to scavenge stream discharge compartment 29. Streams 50 and 52 are in heat exchange relation in heat exchanger 80, with the result that scavenge stream 52 is employed to heat supply stream 50.

In addition to heat exchanger 80, scavenge stream treatment compartment has pivotal damper 90 as another possible outlet. Damper 90 is controlled by a two-position actuator 91, whereby, in a bypass mode (wherein heater 62, cooler 60, and heat exchanger 80 are not operated and dampers 61 and 94 are closed), damper 90 can be pivoted to an open position so that the inlet stream as discharged from fan 40 flows entirely through compartment 26 (as shown by bypass stream 54 in FIG. 1; i.e., none admitted through cooler 60), through the opening formed by damper 90, and into ductwork D to conditioned space CS. Damper 90 is pivoted either to a fully opened or fully closed position.

Scavenge stream discharge compartment 29 has an outlet 93. The size of outlet 93 is defined by a position of pivoting damper element 94 positioned therein. Damper element 94 can be pivoted (under control of actuator 95) either to leave outlet 93 essentially opened; to complete close output 93; or to leave outlet 93 at any of a range of intermediate degrees of opening between closure and full opening. As shown by encircled numeral 5 in FIG. 1, proximate outlet 93 of scavenge stream discharge compartment 29 is the fifth strategic position of system 20.

As shown by encircled numeral 7 in FIG. 1, a further strategic position of system 20 occurs in supply stream discharge compartment 28. To this end, monitoring of a parameter of supply stream 50 occurs in duct D. In particular, duct D is provided with a flow metering station 96 (for monitoring the volume of supply stream 50 leaving compartment 28 for conditioned space CS), a static pressure sensor 98 for control of inlet vane operator 46, and a high limit static pressure sensor 97 for safety.

FIG. 1 further shows that system 20 includes control means, which can take the form of one or more controllers generally depicted by numeral 100. Controller 100 is connected to sensors and actuators of system 20, as understood from the illustration of electrical connection lines labeled with primed reference numerals of the elements to which they connect. For example, line 66' connects controller 100 to cooler thermostat 66. While controller 100 is depicted as being a single, central controller (e.g., processor), it should be understood that other control schemes can be implemented, such as distributed control using appropriate control circuits or mechanisms known to the man skilled in the art. For example, controller 100 can be a direct digital controller, an electric controller, an electromechanical controller, a pneumatic controller, or a controller which is a hybrid of two or more of the foregoing.

As used herein, primed reference numerals of lines connected to controller 100 indicate that the lines are connected to correspondingly numbered but unprimed components of system 20.

Figure 2:
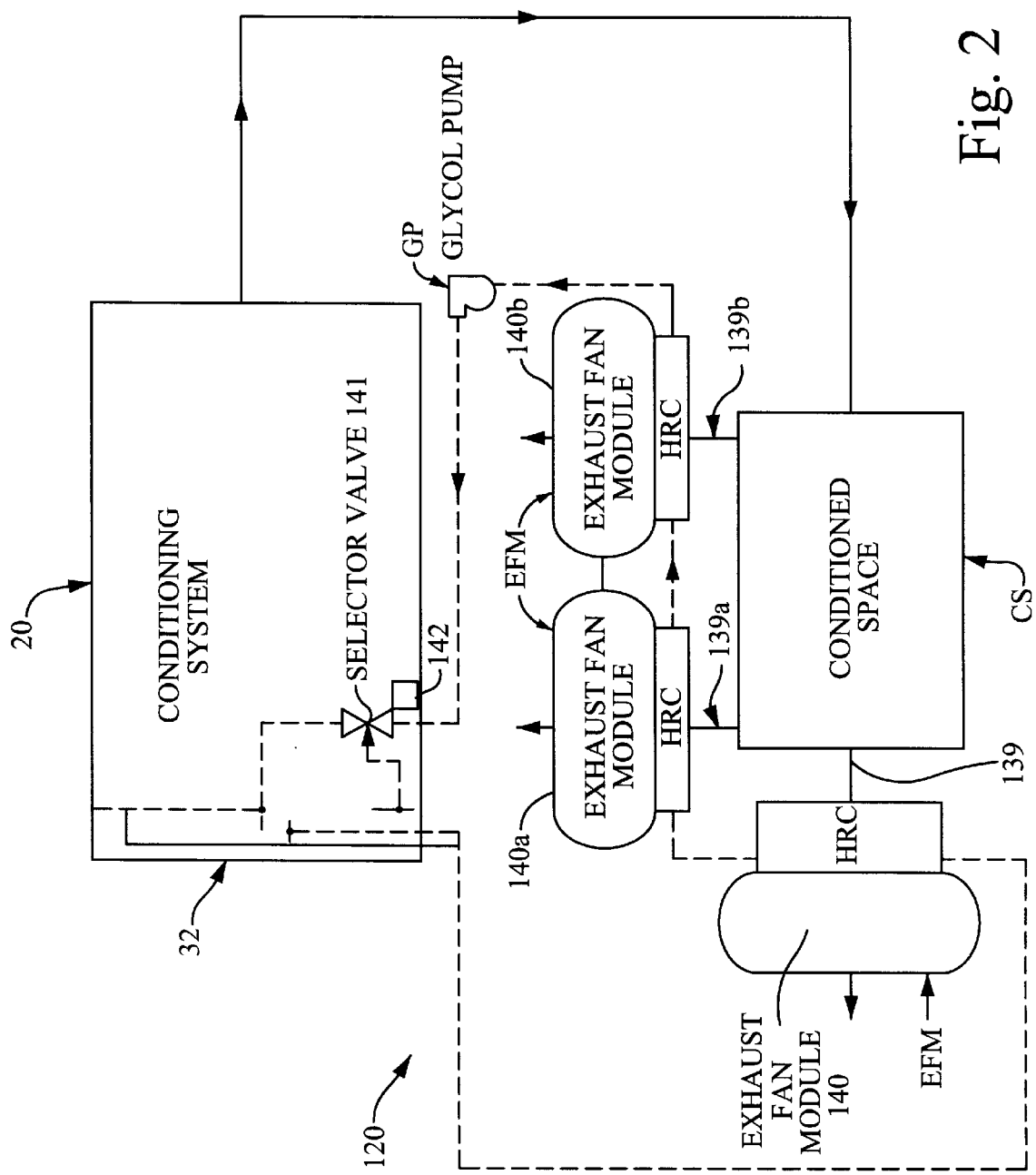
FIG. 2 is a schematic view of an air dehumidifying and condition system according to a second embodiment of the invention, particularly showing an augmentation of the system of FIG. 1.

FIG. 2 shows augmentation of conditioning system 20 (aforedescribed) to form a second embodiment conditioning system 120. In like manner with FIG. 1, system 20 receives input stream 32 and provides stream 50 or 54 via ductwork D to conditioned space CS. However, system 120 differs by having means, such as an exhaust module 140 (and/or multiple exhaust modules 140a, 140b), for extracting air from conditioned space CS (i.e., return air) and means for utilizing the extracted return air in one or more manners.

In the above regard, in system 120, conditioned space is connected via an exhaust 139 or multiple exhaust ducts 139,

139a, 139b. The exhaust modules 140, 140a, 140b are sized to provide heat recovery to pre-heater 62A and pre-cooler 60A. The module 140 may be singular and large in size or smaller multiple units. The multiple module arrangement may reduce the amount of exhaust duct while providing adequate exhaust diversion from the conditioned space.

The typical exhaust module includes an exhaust fan, a set of backdraft dampers, a heat recovery coil, and a housing. In this example, glycol coils and a circulating pump are used, and shown piped in series. The heat recovery coils may be piped in parallel it desired. When pre-cooling can be beneficial, the glycol from the exhaust modules is directed to the pre-cooler 60A. Likewise, when pre-heating is beneficial, the glycol is directed to the pre-heater 62a. This direction is accomplished by selector valve 141 and actuator 142.

An objective of the systems described herein is to provide conditioned space CS with a constant volume of supply stream 50 at a constant temperature and humidity. For purposes of an ensuing description of a first mode of operation, it will be assumed that the selected condition for the supply air is 72 degrees F. and 39.8% humidity, which is to occur in supply stream 50 at encircled position 7 in FIG. 1 and which corresponds to the psychrometric point depicted by encircled numeral 7 on the chart of FIG. 3. Such selected condition can be input to system 20, e.g., input into controller 100.

In the first mode of operation, bypass damper 90 is closed (e.g., by an appropriate control signal on line 91' from controller 100 to actuator 91). In addition, fan motor 48 (consequentially, fan 40), air cooler 60, and heat exchanger 80 are activated. Inlet vane 42 of fan is positioned so that supply stream 50 and scavenge stream 52 will provide sufficient volume for system 20 to meet the requirements of encircled point 7 on the chart of FIG. 3. If heater 62 is necessary for supplying supplemental heat to scavenge stream 52 (e.g., heat supplemental to the inherent heat of input stream 32 as heated by fan 40 and fan motor 48), heater 62 is likewise activated. Scavenge damper 94 is actuated to its maximum open position.

During the first mode of operation, flow metering station 96 in duct D measures the required volume of air to conditioned space CS. Based on calibrated readings from static pressure sensor 98, the position of fan inlet vane 42 is adjusted (e.g., via controller 100 and actuator 46), if needed, to assure requisite air flow. A high limit static pressure sensor 97 is installed in duct D and connected to controller 100 via line 97' to provide protection from a high static pressure condition.

If, during the first mode of operation, the temperature of input stream 32 as ascertained at strategic position 1 were to increase (as determined by thermostat 34), controller 100 would open more the valve 67 of air cooler 60, so as to maintain a near saturated condition at strategic position 4. Simultaneously, controller 100 would close value 69 associated with supplemental heater 62 so as to maintain just enough heat at strategic position 3 to supply heat exchanger 80.

Assuming yet a further rise in temperature of input stream 32 in the above-discussed first mode of operation, controller 100 sends a signal on line 95' to cause controller 95 to close scavenge damper 94, so as not to overheat the air at strategic position 3. The closing of damper 94 causes a rise in static pressure in supply stream 50 as sensed by sensor 98. As a result of the rise in static pressure, controller 100 directs inlet vane actuator 46 to close the inlet vanes 42 of fan 40 in order to maintain the requisite volume of air entering fan 40 and ultimately transmitted to the discharge of supply stream 50.

Thus, in the first mode of operation, controller 100 controls the actuators of system 20 to maintain the strategic positions 1–5 and 7 at the psychrometric conditions shown by respectively encircled numbered points in FIG. 3.

In a second mode of operation (i.e., when moisture content of the incoming air and its temperature are equal to that required at the end of the process), as above described scavenge damper 94 is actuated so that scavenge stream 52 is shut off to heat exchanger 80 and opened to bypass damper 90. Supply stream 50 is shutoff by closing supply damper 61 so that only bypass stream 54 flows through the system.

Yet a third mode of operation is possible when the moisture content of the incoming air is less than that required at the end of the process and only heating is required. In this third mode, positions of dampers enable stream 54 to flow through the system with heater 62 activated.

It should be understood that various modifications and embellishments are provided in other embodiments. For example, inlet 30 can be provided with a hood or louver arrangement to eliminate rain water from input stream 32. Moreover, a filtration device may be positioned upstream from fan 40 for removing undesirable particles, thereby both purifying conditioned space CS and protecting internal components of system 20.

In the illustrated embodiment, cooler 60 is sized for the highest occurring temperatures of the outdoor air, thereby influencing temperature and volume of scavenge stream 52. Because the high temperatures are encountered only very few hours per year, heat exchanger 80 is sized for lower temperatures with more hours of operation.

If desired, a separate heat pipe coil can be provided upstream of air cooler 60 to pre-cool input stream 32.

It should be understood that pre-cooler 60A and pre-heater 62A illustrated herein are optional, and that in other embodiments pre-cooler 60A and pre-heater 62A need not be employed.

The static pressure control system of volume regulation assumes that path 50 has the highest static pressure loss of all paths through system 20. With dampers 90 and 94 closed, the indicated static pressure at sensor 98 establishes the minimum static pressure required to provide the required volume through flow station 96. Opening dampers 90 or 94 will cause a portion of air from fan 40 to follow the path of least resistance diverted from path 50. The resulting loss in static pressure at sensor 98 will cause inlet vanes 42 to open, thereby compensating for the diverted air.

One significant difference between the present invention and conventional methodology is that system 20 of the present invention uses energy from the input stream (e.g., outdoor air) for reheating of the dehumidified, cooled air output by cooler 60.

The present invention particularly lends itself for application to buildings located in high wet bulb temperature zones where outside air is introduced into the conditioned space. The invention is used to condition the outside air prior to its introduction to the conditioned space.

Many construction and operation code requirements indicate that the introduction of dry, clean, and tempered outdoor air is mandatory during occupied time periods of building operation. The underlying reason for this introduction of outdoor air to dilute the air within the conditioned space in an attempt to improve the indoor air quality of the conditioned space. This dilution, in coordination with good exhaust air practices, accomplishes better indoor air quality, provided that the air introduced is of better quality than that of the space.

While the invention has been particularly shown and described with reference to the preferred embodiments thereof, it will be understood by those skilled in the art that various alterations in form and detail may be made therein without departing from the spirit and scope of the invention.

The invention is suited for constant supply volume operation, or variable supply volume operation (based upon $CO_2$ monitoring of levels within the conditioned space).

The embodiments of the invention in which an exclusive property or privilege is claimed are defined as follows:

1. A method of dehumidifying and heating air for supply to a conditioned space, the method comprising:

dividing an input stream of warm and moist air at atmospheric pressure obtained externally to the conditioned space into a scavenge stream and a supply stream and insuring that the scavenge stream and supply stream are not subsequently mixed, the warm and moist air obtained externally having a greater moisture content than a desired moisture content of air in the conditioned space;

controlling volume of the scavenge stream in dependence upon temperature of the input stream;

cooling and dehumidifying the supply stream;

using enthalpy of the scavenge stream to reheat the supply stream without adding moisture from the scavenge stream to the supply stream, and then directing the reheated supply stream to the conditioned space.

2. The method of claim 1, further comprising:

using a motorized fan to impel the input stream of air.

3. The method of claim 1, wherein the step of using the scavenge stream to reheat the supply stream comprises passing the scavenge stream and the supply stream through a heat exchanger.

4. The method of claim 1, further comprising:

supplementarily heating the scavenge stream prior to using the scavenge stream to heat the supply stream.

5. The method of claim 1, further comprising cooling the supply stream to a near saturation state at a moisture content no greater than required in the conditioned space.

6. The method of claim 1, wherein after the scavenge stream is used to heat the supply stream, the scavenge stream is discharged to the outside.

7. A method of operating an air conditioning system for dehumidifying and heating air for supply to a conditioned space, the method comprising:

(1) introducing an input stream of warm and moist air at atmospheric pressure obtained externally to the conditioned space into the system and dividing the input stream of air into a scavenge stream and a supply stream and insuring that the scavenge stream and the supply stream are not subsequently mixed, the warm and moist air obtained externally having a greater moisture content than a desired moisture content of air in the conditioned space; and thereafter, (2) supplementarily heating the scavenge stream;

(3) cooling and dehumidifying the supply stream;

(4) using enthalpy of the scavenge stream to reheat the supply stream without adding moisture from the scavenge stream to the supply stream; and then (5) directing the reheated supply stream to the conditioned space;

(6) controlling induction of the input stream of outside air in step (1) in accordance with a monitored parameter of the reheated supply stream;

(7) controlling the cooling of step (3) and the heating of step (2) in dependence upon temperature of the input stream of air introduced at step (1).

8. The method of claim 7, wherein in step (3) the supply stream is cooled to a near saturation state at a moisture content no greater than required in the conditioned space.

9. The method of claim 7, wherein the monitored parameter is static pressure of the heated supply stream.

10. The method of claim 7, further comprising controlling volume of the scavenge stream from the system in dependence upon temperature of the input stream of air introduced at step (1).

11. The method of claim 7, wherein after the scavenge stream is used to heat the supply stream, the scavenge stream is discharged externally to the conditioned space.

12. The method of claim 7, further comprising:

using a motorized fan to impel the input stream of air into the scavenge stream and the supply stream.

13. The method of claim 7, wherein the step of using the scavenge stream to reheat the supply stream comprises passing the scavenge stream and the supply stream through a heat exchanger.

14. A system of dehumidifying and heating air for supply to a conditioned space, the system comprising:

a fan which impels an input stream of warm and moist air at atmospheric pressure obtained externally to the conditioned space into the system, the warm and moist air obtained externally having a greater moisture content than a desired moisture content of air in the conditioned space;

means for dividing the impelled input stream of air into a scavenge stream and a supply stream and for insuring that the scavenge stream and supply stream are not subsequently mixed;

means for controlling volume of the scavenge stream from the system in dependence upon temperature of the input stream;

means for cooling and dehumidifying the supply stream;

means for using enthalpy of the scavenge stream to reheat the supply stream without adding moisture from the scavenge stream to the supply stream, and a duct for directing the reheated supply stream to the conditioned space.

15. The system of claim 14, wherein the means for cooling and dehumidifying comprises a cooling coil.

16. The system of claim 14, wherein the means for using the scavenge stream to heat the supply stream comprises a heat exchanger.

17. The system of claim 14, further comprising:

supplemental heating means for heating the scavenge stream prior to using the scavenge stream to heat the supply stream.

18. The apparatus of claim 14, wherein the fan is situated to provide positive pressure for the means for cooling and dehumidifying the supply system and the means for using enthalpy of the scavenge stream to reheat the supply stream.

19. An air conditioning system for dehumidifying and heating air for supply to a conditioned space, the system comprising:

a fan which impels an input stream of warm and moist air at atmospheric pressure obtained externally to the conditioned space into the system, the warm and moist air obtained externally having a greater moisture content than a desired moisture content of air in the conditioned space;

means for dividing the input stream of air into a scavenge stream and a supply stream and for insuring that the scavenge stream and the supply stream are not subsequently mixed;

means for supplementarily heating the scavenge stream;

cooling means for cooling and dehumidifying the supply stream;

means for using enthalpy of the scavenge stream to reheat the supply stream without adding moisture from the scavenge stream to the supply stream;

means for directing the reheated supply stream to the conditioned space;

means for controlling the fan in accordance with a monitored parameter of the reheated supply stream;

means for controlling the cooling means and the supplementarily heating means in dependence upon temperature of the input stream of air introduced by the fan.

20. The system of claim 19, wherein the cooling means cools the supply stream to a near saturation state at a moisture content no greater than required in the conditioned space.

21. The system of claim 19, further comprising a static pressure monitor situated in the directing means, and wherein the monitored parameter is static pressure of the dehumidified and reheated supply stream.

22. The system of claim 19, further comprising:

means for controlling volume of the scavenge stream from the system in dependence upon temperature of the input stream of air introduced by the fan.

23. The system of claim 19, further comprising:

control means for selectively actuating activation of the means for supplementarily heating the scavenge stream and the means for cooling the supply stream.

24. The system of claim 19, wherein the dividing means comprises a chamber split to partition the impelled input stream of air into the scavenge stream and the supply stream.

25. The system of claim 19, wherein the cooling means comprises a cooling coil.

26. The system of claim 19, wherein the means for using the scavenge stream to heat the supply stream comprises a heat exchanger.

27. The apparatus of claim 19, further comprising means for controlling volume of the scavenge stream from the system in dependence upon temperature of the input stream.

28. The apparatus of claim 19, wherein the fan is situated to provide positive pressure for the means for cooling and dehumidifying the supply system for using enthalpy of the scavenge stream to reheat the supply stream.

29. A method of operating an air conditioning system for treating air for supply to a conditioned space, the method comprising:

(1) introducing an input stream of air into the system and dividing the input stream of air into a scavenge stream and a supply stream;

(2) supplementarily heating the scavenge stream;

(3) cooling the supply stream;

(4) using the scavenge stream to heat the supply stream; and then (5) directing the heated supply stream to the conditioned space;

(6) controlling introduction of the input stream of air in step (1) in accordance with a monitored parameter of the heated supply stream;

(7) controlling the cooling of step (3) and the heating of step (2) in dependence upon temperature of the input stream of air introduced at step (1);

controlling volume of the scavenge stream from the system in dependence upon temperature of the input stream of air introduced at step (1).

30. An air conditioning system for treating air for supply to a conditioned space, the system comprising:

means for introducing an input stream of air into the system;

means for dividing the input stream of air into a scavenge stream and a supply stream;

means for supplementarily heating the scavenge stream;

means for cooling the supply stream;

means for using the scavenge stream to heat the supply stream;

means for directing the heated supply stream to the conditioned space;

means for controlling the introducing means in accordance with a monitored parameter of the heated supply stream;

means for controlling the cooling means and the supplementarily heating means in dependence upon temperature of the input stream of air introduced by the introducing means; and means for controlling volume of the scavenge stream from the system in dependence upon temperature of the input stream of air introduced by the introducing means.

31. A system of dehumidifying and heating air for supply to a conditioned space, the system comprising:

a fan which impels an input stream of warm and moist air at atmospheric pressure obtained externally to the conditioned space into the system, the warm and moist air obtained externally having a greater moisture content than a desired moisture content of air in the conditioned space;

means for dividing the impelled input stream of air into a scavenge stream and a supply stream and for insuring that the scavenge stream and supply stream are not subsequently mixed;

means for controlling volume of the scavenge stream from the system in dependence upon temperature of the input stream;

means for cooling and dehumidifying the supply stream;

means for using enthalpy of the scavenge stream to reheat the supply stream without adding moisture from the scavenge stream to the supply stream, and a duct for directing the reheated supply stream to the conditioned space;

wherein the dividing means comprises a chamber split to partition the impelled input stream of air into the scavenge stream and the supply stream.

* * * * *